ized Patent [19]

Davis et al.

[11] 4,131,478
[45] Dec. 26, 1978

[54] SEALING GLASS COMPOSITIONS AND METHOD

[75] Inventors: Earl K. Davis, Tempe; Kent W. Hansen, Scottsdale, both of Ariz.

[73] Assignee: Motorola, Inc., Schaumburg, Ill.

[21] Appl. No.: 828,017

[22] Filed: Aug. 26, 1977

[51] Int. Cl.² ................................................ C03C 3/10
[52] U.S. Cl. ................................... 106/53; 106/47 R; 106/49; 106/73.4
[58] Field of Search ........................................... 106/53

[56] References Cited

U.S. PATENT DOCUMENTS

| | | | |
|---|---|---|---|
| 2,643,020 | 6/1953 | Dalton | 106/53 X |
| 2,959,493 | 11/1960 | Vincent | 106/53 X |
| 3,127,278 | 3/1964 | Francel et al. | 106/53 |
| 3,228,548 | 1/1966 | Butler | 106/53 |
| 3,485,648 | 12/1969 | Bishop | 106/53 |
| 3,947,279 | 3/1976 | Hudecek | 106/53 |
| 3,954,486 | 5/1976 | Francel et al. | 106/53 |
| 3,964,920 | 6/1976 | Davis et al. | 106/53 |
| 3,973,975 | 8/1976 | Francel et al. | 106/53 |
| 4,038,091 | 7/1977 | Francel et al. | 106/53 |
| 4,073,657 | 2/1978 | Davis et al. | 106/53 |

FOREIGN PATENT DOCUMENTS 827197  11/1969  Canada ........................................ 106/53

Primary Examiner—Helen McCarthy
Attorney, Agent, or Firm—John A. Fisher

[57] ABSTRACT

A solder glass/ceramic composition and method for sealing television picture tube components wherein the composition remains vitreous throughout the sealing process. The composition comprises a mixture of 9–15 weight percent aluminum oxide and 91–85 weight percent solder glass. The solder glass components comprise, in weight percent of the glass alone, $SiO_2$ about 2–4 percent, PbO about 64–66 percent, $PbF_2$ about 5–10 percent, ZnO about 6–9 percent, CdO about 4–6 percent, and $B_2O_3$ about 12–14 percent.

2 Claims, 2 Drawing Figures

SEALING GLASS COMPOSITIONS AND METHOD

BACKGROUND OF THE INVENTION

This invention relates to sealing glass compositions and more particularly to nondevitrifying sealing glass compositions and to a method for sealing together the component parts of television picture tubes using those compositions.

In the fabrication of television picture tubes the faceplate of the picture tube must be hermetically sealed to the tube funnel. Normally, devitrifying sealing glasses are used for this purpose where a devitrifying glass is one which crystallizes during the sealing operation. In contrast, a non-devitrifying (or vitreous) glass does not form crystals during the sealing cycle. Instead, as a vitreous glass is cooled, the viscosity of the liquid increases steadily and the glass can be considered a disordered amorphous solid or a supercooled liquid. Devitrifying glasses have been used because they were thought necessary to insure a hard, rigid bond that would maintain its integrity during subsequent heating steps in the tube fabrication process. The use of devitrifying glasses, however, introduces difficult processing problems such as requirements for rigid temperature-time controls during sealing. With sealing glasses that crystallize, the rate of heating is extremely important. If the rate of heating is too slow, for example, the glass can devitrify before a good bond is formed with the glass pieces being sealed together. The maximum sealing temperature must also be closely controlled to insure proper crystallization. Additionally, since the degree of crystallization depends upon time, the pieces being sealed together must be held at the sealing temperature for long time periods, over one-half hour in many cases, to allow the devitrification reaction to reach completion. Such long sealing times are expensive because of the amount of equipment needed for a given throughput, and because of the energy required. Finally, the use of devitrifying glasses makes the reworking of defective seals almost impossible; once the glass has crystallized, temperatures much higher than the original sealing temperature are required to remelt the seal.

In view of the foregoing, it should now be understood that it would be desirable to provide improved sealing glass compositions that would solve the above and other problems.

Accordingly, one of the objects of the present invention is to provide a nondevitrifying (vitreous) solder glass/ceramic mixture suitable for the sealing together of television picture tube components.

Other vitreous sealing glass compositions have previously been disclosed, such as the composition disclosed in U.S. Pat. No. 3,964,920. This sealing glass composition, however, has been formulated for the specific application of sealing ceramic packages for semiconductor devices and is not suitable for the present use. It is, therefore, a further object of the invention to provide a solder glass/ceramic mixture which has the proper expansion coefficient, strength, sealing temperature, and short required sealing time for the specific application of sealing television picture tubes.

It is still a further object of the invention to provide a method for sealing together the component parts of a television picture tube.

BRIEF SUMMARY OF THE INVENTION

In carrying out the invention there is provided a solder glass/ceramic mixture comprising a combination of nine to fifteen weight percent aluminum oxide ($Al_2O_3$) and ninety-one to eighty-five weight percent solder glass, the components of the solder glass comprising weight percentage amounts as follows: $SiO_2$ about 2–4 percent, PbO about 64–66 percent, $PbF_2$ about 5–10 percent, ZnO about 6–9 percent, CdO about 4–6 percent and $B_2O_3$ about 12–14 percent. The composition, which does not devitrify during sealing, comprises a mixture of components making up a solder glass and an inert additive material (alumina) which results in the desired temperature coefficient of expansion, strength, and sealing temperature to produce an improved sealant for the specific type of glasses found in picture tube manufacture.

The solder glass/ceramic mixture can be mixed with a suitable binder and solvent in order to form a paste. The paste is then applied to one of the glass pieces to be joined. The glass pieces are brought into contact, heated to drive off the organic solvent, and then heated further to effect the seal. The picture tube can then be cooled slowly to produce a low strain seal between the tube faceplate and funnel.

BRIEF DESCRIPTION OF THE DRAWINGS

Other objects and advantages of the invention will become apparent after consideration of the following detailed description taken in consideration of the drawings in which.

DESCRIPTION OF THE PREFERRED EMBODIMENT

Figure 1:
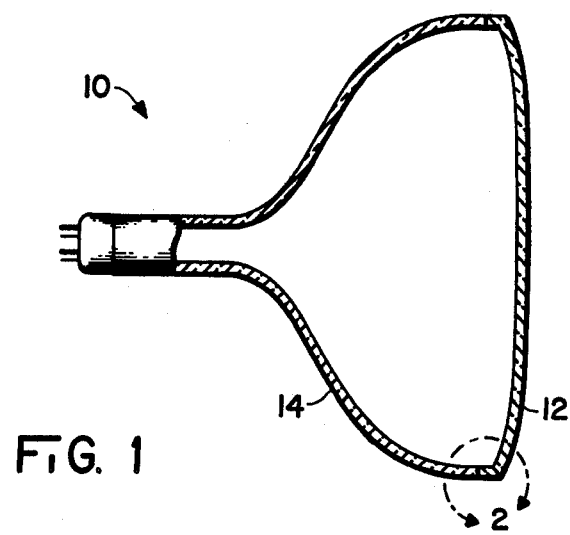
FIG. 1 is a side view of a television picture tube.

Referring to the drawings, there is shown in FIG. 1 a television picture tube 10. The tube 10 is comprised of a faceplate 12 and a funnel 14 which must be hermetically sealed together to form a portion of the complete picture tube structure.

Glasses used for television picture tube faceplates and funnels typically have thermal expansion coefficients in the range of about $90–100 \times 10^{-7}/°$ C. ($0°–300°$ C.). To promote a reliable seal between such glass parts, the sealing glass composition must have a compatible expansion coefficient to give a low stress seal. The composition must also form a strong seal, have a sealing temperature in the range of $400°–500°$ C., and preferably remain vitreous during the sealing operation. The solder glass/ceramic mixture according to the invention has these desirable properties. The composition comprises a mixture of solder glass ingredients and alumina (aluminum oxide, $Al_2O_3$).

The ingredients of the present solder glass are set out in Table I according to chemical formula, the weight range in percent, and the preferred weight in percent. Also included in Table I, for comparison purposes, are the ingredients of the solder glass of U.S. Pat. No. 3,964,920.

TABLE I

| Chemical formula | weight percent range | weight percent preferred | 3,964,920 preferred |
|---|---|---|---|
| $SiO_2$ | 2–4 | 3 | 1 |
| PbO | 64–66 | 66 | 70 |
| $PbF_2$ | 5–10 | 5 | 5 |

TABLE I-continued

| Chemical formula | weight percent range | weight percent preferred | 3,964,920 preferred |
|---|---|---|---|
| ZnO | 6–9 | 9 | 9 |
| CdO | 4–6 | 5 | 2 |
| $B_2O_3$ | 12–14 | 12 | 12 |
| $TiO_2$ | 0 | 0 | 1 |

Both mixtures are directed to low temperature vitreous solder glasses. There are small but significant differences between the two compositions. In addition to the elimination of the titanium dioxide, the present mixture has slightly higher percentages of $SiO_2$ and CdO. The $SiO_2$ and CdO percentages have been raised to increase the resistance of the mixture to devitrification. It has been determined that even a one percent increase in $SiO_2$ content can be significant in reducing devitrification. Too much $SiO_2$ in the mixture, however, increases the sealing temperature and simultaneously lowers the thermal expansion coefficient. The amount of $SiO_2$ in the mixture can be advantageously increased to the range of two to four percent, however, by simultaneously increasing the percentage of CdO. The increases in $SiO_2$ and CdO are both done at the expense of the PbO content of the mixture. It is felt that whenever devitrification does occur in these types of glasses, crystals are formed that have the structure $PbO.ZnO.B_2O_3$ in the ratio of either 2:1:1 or 1:2:1. The addition of small amounts of certain other selected materials, such as $SiO_2$, to the melt decreases the possiblity of this crystalline structure forming and thus increases the resistance to devitrification.

The physical properties of the two glasses are compared in Table II.

TABLE II

| Physical properties of the solder glass | preferred solder glass | 3,964,920 |
|---|---|---|
| thermal expansion coefficient (average 25–250° C) | $100 \times 10^{-7}/°$ C | $107 \times 10^{-7}/°$ C |
| anneal point | 325° C | 309° C |
| density | 6.29 gm/cc | 6.43 gm/cc |

The glass was prepared by melting batch materials in an electrically heated furnace at 900° C. in a platinum crucible. The melt was stirred for at least one hour to obtain a homogeneous glass. After melting and fining were complete the glass was cooled to 800° C. and then fritted by pouring the melt into water or quenching between water cooled rollers. The water quenched frit was then dryed at 100° C. to remove excess moisture.

Batches of 1500 grams of frit were ground two hours in 1.33 gallon ball mill that first had been filled about forty-five percent full with three-quarter inch cylindrical shaped Burundum grinding media. That portion of the ground glass that passed through a 150 mesh sieve was then mixed with the alumina. Fifteen hundred gram batches of the solder glass/ceramic mixture with the proportions shown in Table III were then blended for one hour in a 1.33 gallon ball mill. The particular alumina used in the mixture was RC-122BM supplied by the Chemical Division of Reynolds Metals Company of Richmond, Virginia. The alumina, as supplied, is typically 99.7% $Al_2O_3$ and has a typical mean particle size of 4.8μ with 98% smaller than 325 mesh. Those skilled in the art will appreciate that other aluminum oxide could also be used within the spirit of the invention.

TABLE III

| | Weight percent solder glass/alumina | | |
|---|---|---|---|
| Example | 1 | 2 | 3 |
| Solder glass | 91 | 87 | 83 |
| Alumina (Reynold's RC-122BM) | 9 | 13 | 17 |

The pertinent physical properties of the solder glass/ceramic mixture were measured. The results are summarized in Table IV. Using alumina as the ceramic material, the range of 9–15 weight percent gives excellent results. The addition of more than 15 weight percent of alumina inhibits the flow of the mixture; adding less than 9 weight percent would compromise the strength of the mixture.

TABLE IV

| | Physical properties of the solder glass/alumina mixture | | |
|---|---|---|---|
| Example | 1 | 2 | 3 |
| modulus of rupture | | 7900 ± 800psi | |
| button flow (diameter after firing) | 1.050 in. | 1.048 in. | 0.974 in. |
| thermal expansion coefficient (average 25–300° C) | $92.7 \times 10^{-7}/°$ C | $90.2 \times 10^{-7}/°$ C | $89.5 \times 10^{-7}/°$ C |
| Fusion test stress (fused to faceplate) | 70psi | 170psi | 440psi |

The modulus of rupture was measured using a 4-point loading device and an Instron testing unit. The samples were prepared by pressing bars about two and one-quarter inches by one-quarter inch by one-quarter inch. These were placed in a furnace at 440° C. and soaked for twenty minutes. After firing, the surfaces of the test specimens were abraded with a 220 mesh silicon carbide abrasive before testing.

The tendency to "flow" was measured using a "button flow" test. This test involved pressing a ten gram pellet three-quarter inch in diameter, followed by heating at 420° C. for twenty minutes. The sample was supported by a piece of PPG solar gray glass four inches by four inches by one-quarter inch during the heating. The diameter of the button was measured after heat treatment.

The coefficient of thermal expansion was measured using an Orton fused silica dilatometer. Expansion bars one inch in length and one-quarter inch by one-eighth inch in cross-sectional area were prepared by pressing the glass/ceramic mixture into the desired shape followed by heat treatment at 440° C. for twenty minutes. A more direct measure of the compatibility for thermal mismatch was obtained by measuring residual stresses in glasses that had been sealed together. This was accomplished by fusing a one-eighth inch by one-eighth inch by one inch bar of the mixture to a piece of television tube faceplate which was one-quarter inch by seven-sixteenths inch by one inch. The resultant stress at room temperature was then determined by measuring the birefringence in the faceplate glass. A resultant stress of less than 500 psi is considered completely acceptable for television tube manufacture.

Figure 2:
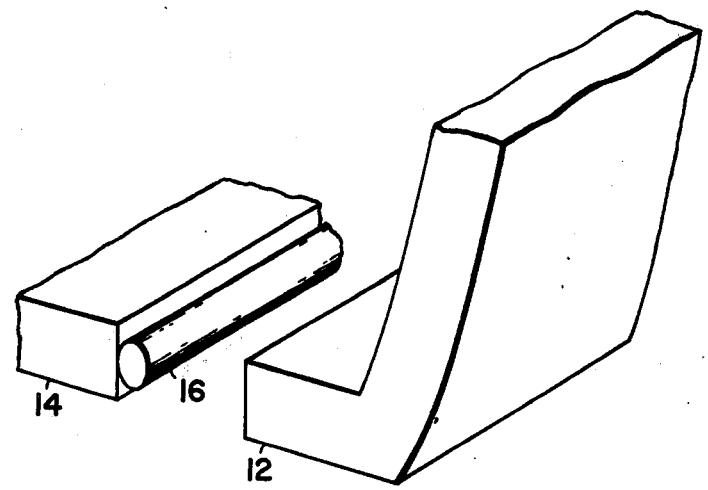
FIG. 2 is a fragmentary view of the junction between the television picture tube faceplate and funnel.

Turning again to the Drawings, FIG. 2 shows that portion of the television picture tube 10 at which a seal is to be effected between the tube faceplate 12 and the tube funnel 14. The solder glass/ceramic composition according to the invention is mixed with a suitable binder and solvent to make a paste-like mixture. A bead 16 of this paste-like mixture is applied to one or both of the glass pieces 12, 14 by any of the well known application techniques including extrusion, screen printing, painting and spraying. The particular application technique selected will determine, to some extent, the required consistency of the paste-like mixture, and thus the selection and amount of the binder and solvent used. After applying the bead 16 of the sealing glass composition, the two glass pieces 12, 14 are brought into contact. The weight of the faceplate is sufficient to spread out the bead 16 of sealing glass so that it is distributed over the joining area. The picture tube assembly is then raised in temperature to about 300°–350° C. to drive off the remaining solvent. The assembly can then be further heated to the sealing temperature. It has been determined that excellent seals result when the glass parts and the sealing glass mixture are maintained at a temperature of 420°–450° C. for a period of about five minutes. The tube assembly can then be slowly cooled to room temperature with the exact cooling rate being partially dependent on previous and future temperature cycling that the assembly encounters.

The results presented show that there has been provided, in accordance with the invention, a solder glass/ceramic mixture and method that fully satisfy the objects and advantages set forth above.

What is claimed is:

1. A non-devitrifying sealing glass composition consisting essentially of about 85–91 weight percent of solder glass and about 15–9 weight percent of $Al_2O_3$ wherein the solder glass consists essentially of by weight: $SiO_2$ about 3 percent, PbO about 66 percent, $PbF_2$ about 5 percent, ZnO about 9 percent, CdO about 5 percent and $B_2O_3$ about 12 percent.

2. The non-devitrifying sealing glass composition of claim 1 wherein the percentage amounts of solder glass and $Al_2O_3$ are about 87 weight percent solder glass and 13 weight percent $Al_2O_3$.

* * * * *